(12) United States Patent
Nishide

(10) Patent No.: US 6,498,734 B1
(45) Date of Patent: Dec. 24, 2002

(54) POWER SUPPLY UNIT HAVING REDUCED SIZE AND WEIGHT AND AN ELECTRONIC APPARATUS USING THE SAME

(75) Inventor: Takuya Nishide, Mie (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 13 days.

(21) Appl. No.: 09/937,081

(22) PCT Filed: Jan. 19, 2001

(86) PCT No.: PCT/JP01/00338

§ 371 (c)(1),
(2), (4) Date: Feb. 4, 2002

(87) PCT Pub. No.: WO01/54257

PCT Pub. Date: Jul. 26, 2001

(30) Foreign Application Priority Data

Jan. 21, 2000 (JP) .......................................... 2000-012549

(51) Int. Cl.[7] .............................................. H02M 3/335
(52) U.S. Cl. ...................................... 363/21.04; 363/97
(58) Field of Search ............................... 363/20, 21.01, 363/21.04, 95, 97

(56) References Cited

U.S. PATENT DOCUMENTS 5,508,904 A * 4/1996 Hara ............................ 363/21
5,619,403 A * 4/1997 Ishikawa et al. ............... 363/21
5,640,315 A * 6/1997 Hirano et al. .................. 363/41
5,973,946 A * 10/1999 Yasumura ...................... 363/89

FOREIGN PATENT DOCUMENTS

| JP | 56-139075 | 10/1981 |
| JP | 59-110376 | 6/1984 |
| JP | 02-026382 | 2/1990 |

* cited by examiner

Primary Examiner—Adolf Deneke Berhane
(74) Attorney, Agent, or Firm—McDermott, Will & Emery

(57) ABSTRACT

A power supply unit having: transformer (2) with primary winding (2p) connected to D.C. power supply (1); switching element (3) connected to the primary winding (2p) of the transformer (2); forward controller (4) for controlling the switching element (3); rectifier element (5), choke coil (7), switching element (19) and smoothing circuit (8), all connected in series between secondary winding of the transformers (2) and output terminal (9); rectifier element (6) connected in parallel with the rectifier element (5) and the secondary winding; and switching element (21) and smoothing circuit (22) connected in series between an output terminal of the rectifier elements (5) and output terminal 24. The forward controller (4) controls the switching element (3) responsive to an output voltage of the smoothing circuit (8). Divider control circuit (23) controls the switching element (21) responsive to an output voltage of the smoothing circuit (22).

10 Claims, 12 Drawing Sheets

POWER SUPPLY UNIT HAVING REDUCED SIZE AND WEIGHT AND AN ELECTRONIC APPARATUS USING THE SAME

FIELD OF THE INVENTION

The present invention relates to a power supply unit used for electronic apparatus such as office automation equipment of various kinds. The invention also relates to an electronic apparatus using the same.

BACKGROUND OF THE INVENTION

A conventional power supply unit is shown in FIG. 12.

As shown in FIG. 12, primary winding 2p of transformer 2 is connected to D.C. power supply 1. The primary winding 2p is also connected with switching element 3 and forward controller 4 for controlling the switching element 3. The forward controller 4 has forward control circuit 4a and voltage comparator 4b. Output terminal 9 is connected to secondary winding 2s of the transformer 2 through rectifier element 5, choke coil 7, and smoothing circuit 8. Another rectifier element 6, one end of which is grounded, is connected to a point of connection between the rectifier element 5 and the choke coil 7. A structure described above is an example of so-called forward-type power supply unit. A supply of 24 volts, for instance, is obtained from the output terminal 9.

In order to obtain another output from the above-described forward-type power supply unit, chopper power supply unit 12 is connected to a point of connection between the choke coil 7 and the smoothing circuit 8 through smoothing means comprised of choke coil 10 and capacitor 11. A voltage of 5 volts, for instance, is output from output terminal 17. This chopper power supply unit comprises switching element 13, rectifier element 14, choke coil 15, smoothing circuit 16, and chopper control circuit 18.

In other words, electric power is supplied to the chopper power supply unit 12 from the point of connection between the choke coil 7 and the smoothing circuit 8 of the forward-type power supply unit through the smoothing circuit comprised of the choke coil 10 and the capacitor 11. The chopper power supply unit 12 carries outs voltage conversion by chopping and controlling current that flows into the choke coil 15 with the switching element 13. As a result, it can supply electric power of several amperes or more at 5 volts from the output terminal 17.

As described above, the conventional power supply unit requires the choke coil 15 for converting voltage, and the choke coil 10 and the capacitor 11 for smoothing the voltage. That is, in order to make voltage-current conversion of the D.C. voltage efficiently, the chopper power supply unit 12 controls a conducting period of the switching element to regulate the current flowed to the choke coil 15, and outputs the converted voltage to the output terminal 17. The choke coil 15 is needed for this purpose.

Moreover, there occurs a ripple voltage in the output terminal 9, because a switching cycle of the switching element 13 does not synchronize with the forward-type power supply. The choke coil 10 and the capacitor 11 are therefore necessary to prevent it. In order to satisfy the required characteristic, it is imperative for these choke coils 10 and 15 to be considerably large in size. This is one of the reasons that make difficult to downsize and lighten the power supply unit and electronic apparatuses using the same.

DISCLOSURE OF THE INVENTION

The present invention is devised in consideration of the foregoing aspect, and it aims to reduce size and weight of power supply unit and electronic apparatus.

To achieve the above object, a power supply unit of this invention comprises:

a transformer having a primary winding connected in series to a D.C. power supply;

a first switching element having a control terminal and connected in the series to the primary winding;

a first rectifier element connected in series to a secondary winding of the transformer;

a choke coil connected in series to the first rectifier element;

a second switching element connected in series to the choke coil;

a first smoothing circuit connected in series to the second switching element;

a control circuit being input with an output voltage of the first smoothing circuit, for controlling the first switching element;

a second rectifier element connected in parallel with the first rectifier element and the secondary winding;

a third switching element connected in series to the choke coil;

a second smoothing circuit connected in series to the third switching element; and a divider control circuit having a first input terminal being input with any of an input voltage and an output voltage of the second smoothing circuit, for controlling a conducting period of the third switching element responsive to the voltage being input.

An electronic apparatus of this invention comprises the power supply unit described above, a load device (e.g. an actuator), and a controller for the load device, wherein the first smoothing circuit supplies electric power to the load device, and the second smoothing circuit supplies electric power to the controller for controlling the load device.

THE BEST MODES FOR CARRYING OUT THE INVENTION

Figure 1:
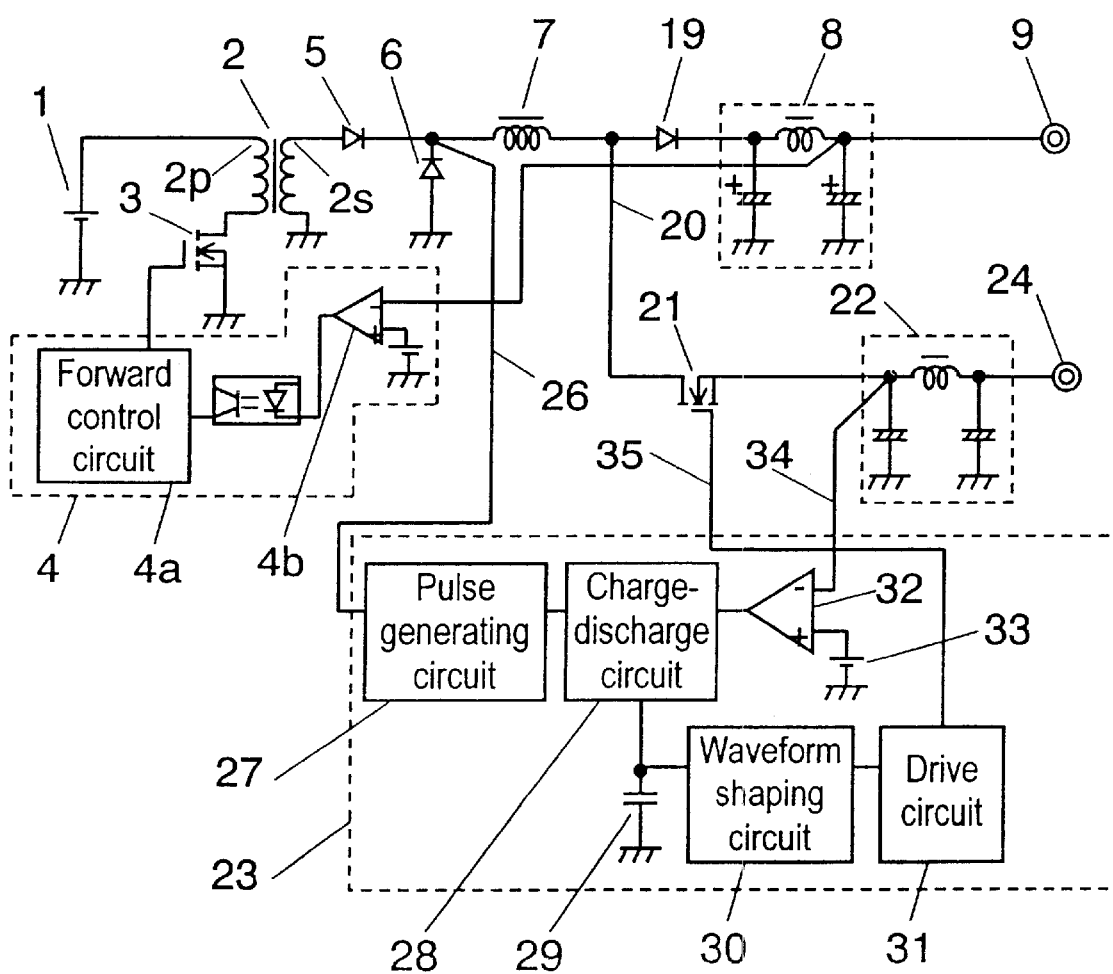
FIG. 1 is an electric circuit diagram of a power supply unit of a first exemplary embodiment of the present invention.

Exemplary embodiments of the present invention will be described hereinafter with reference to the accompanying drawings. Like reference numerals are used to represent like components in the following descriptions.

(First Exemplary Embodiment)

Figure 2:
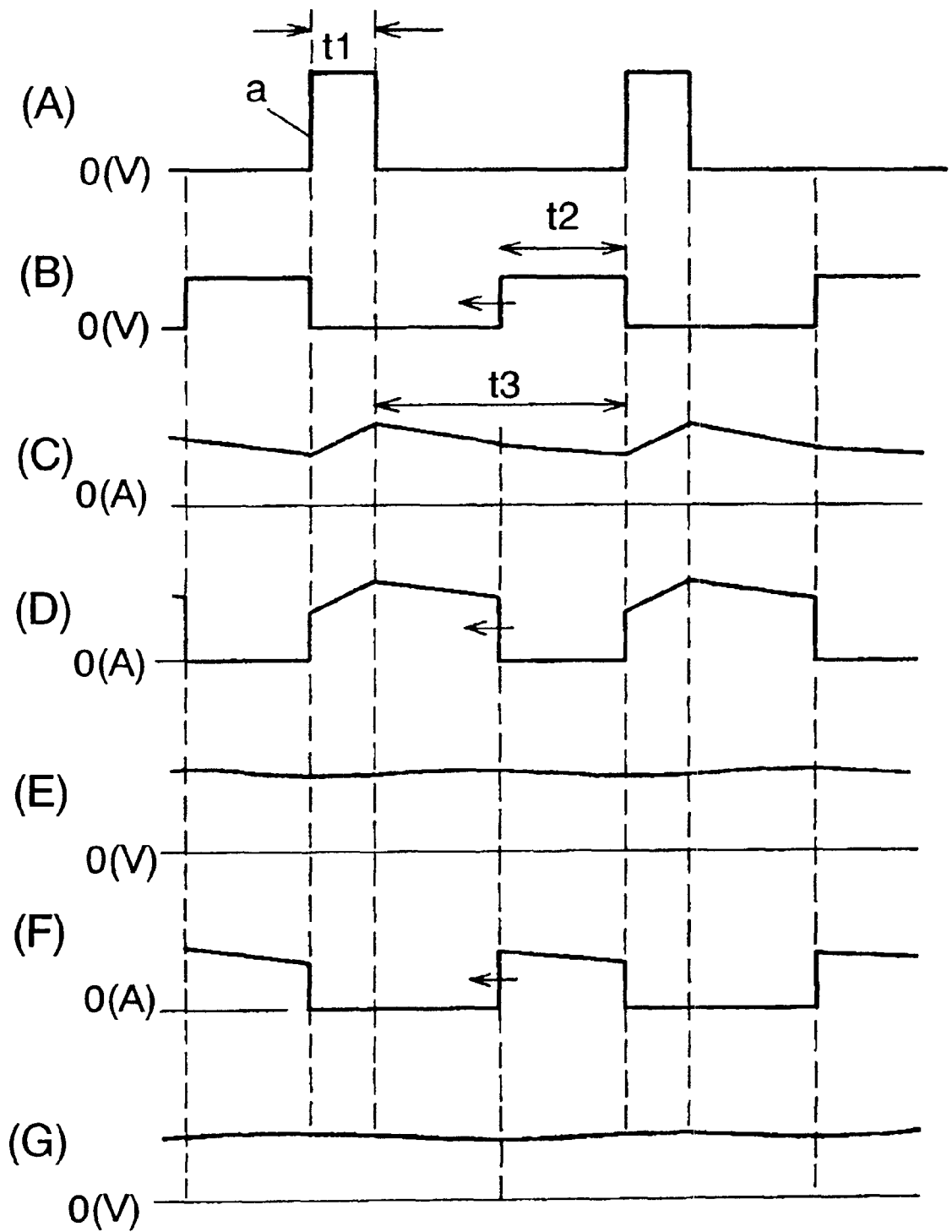
FIG. 2 is a graphical illustration representing operation of the same.

FIG. 1 shows a block diagram of a power supply unit of a first exemplary embodiment of the present invention, and FIG. 2 shows operating waveforms of the same.

In FIG. 1, primary winding 2p of transformer 2 is connected to D.C. power supply 1. This primary winding 2p is also connected with switching element 3 and forward controller 4. Secondary winding 2s of the transformer 2 is connected with output terminal 9 through rectifier element 5, choke coil 7, and smoothing circuit 8. In addition, rectifier element 6 is connected from a point of connection between the rectifier element 5 and the choke coil 7 to a ground. Thus, although a fundamental structure of the forward-type power supply unit is analogous to the prior art example as described, there comprises switching element 19 between the choke coil 7 and the smoothing circuit 8.

There are switching element 21, smoothing circuit 22, and output terminal 24 connected serially in this order from a point of connection between the choke coil 7 and the switching element 19. There is also provided with divider control circuit 23 which controls a conducting period of the switching element 21 (hereinafter referred to as MOSFET 21) responsive to an input voltage from the smoothing circuit 22.

Actual operation is now described by using FIG. 1 and FIG. 2. When the switching element 3 is turned on, an electric current flows from the D.C. power supply 1 to the primary winding 2p of the transformer 2. At the same time, an electric current in inverse proportion to a number of turns of the transformers 2 flows from the secondary winding 2s of the transformer 2 to the choke coil 7 through the rectifier element 5. A voltage of more than 10 volts is generated at a cathode side of the rectifier element 5 for a time period of "t1", as shown in FIG. 2(A).

FIG. 2(C) shows a waveform of the current that flows to the choke coil 7. An electric current in a period of "t3" is a flywheel current that flows to the rectifier element 6.

Here, the divider control circuit 23 generates a gate voltage, that is a high-level voltage, in a time period of "t2", as shown in FIG. 2(B). The gate voltage is applied to a gate of the MOSFET 21, and the MOSFET 21 conducts for the period of "t2". As a result, an electric current having a waveform shown in FIG. 2(F) flows. The smoothing circuit 22 outputs a D.C. voltage shown in FIG. 2(G) to the output terminal 24. The output terminal 24 is connected with a controller (not show in the figure) for controlling a load device (e. g., an actuator such as a motor) of an electronic apparatus.

The switching element 19 prevents a back-flow of electric current from the smoothing circuit 8 to the MOSFET 21 during the period of "t2". An electric current of the choke coil 7 flows to the switching element 19 during a period other than the period "t2", as shown in FIG. 2(D). This causes the smoothing circuit 8 output a D.C. voltage shown in FIG. 2(E) to the output terminal 9. The output terminal 9 is connected with another load device (not show in the figure) of the electronic apparatus.

The output terminal 9 outputs a generally constant voltage between 12 and 20 volts, for example, and the output terminal 24 outputs a generally constant voltage between 5 and 7 volts, for example.

In this instance here, output voltage of the smoothing circuit 22 decreases when there is a load current flowing from the output terminal 24. The divider control circuit 23 detects the decrease in this voltage, and extends the high-level period (t2) for the gate toward a direction of the left-pointing arrow. This prolongs the conducting period of time of the MOSFET 21. Hence, the electric current to the smoothing circuit 22 increases, and the voltage is controlled to a prescribed value.

When the period of "t2" is prolonged, an amount of the current that flows to the switching element 19 decreases, and the output voltage of the smoothing circuit 8 also decreases. However, voltage comparator 4b in the forward controller 4 detects the decrease in this voltage, and increases the conducting time of the switching element 3. This causes an increase in the electric current of the secondary winding 2s, and as the result the output voltage of the smoothing circuit is controlled to be constant.

A structure of the divider control unit 23 will be described next. The voltage from the cathode side of the rectifier element 5 is input to pulse generator circuit 27, and its output is input to charge/discharge circuit 28. An input voltage (or an output voltage) of the smoothing circuit 22 is input to one of input terminals of differential circuit 32, and reference voltage 33 is input to the other input terminal. The differential circuit amplifies and outputs a difference in voltage potential between these inputs. The charge/discharge circuit 28 is connected with capacitor 29, one end of which is grounded. An output voltage of the charge/discharge circuit 28 is input to waveform shaping circuit 30 defining a comparator, and the waveform is shaped into rectangular wave. An output of the waveform shaping circuit 30 is input to driving circuit 31, and an output of the driving circuit 31 is input to the gate terminal of the MOSFET 21.

Figure 3:
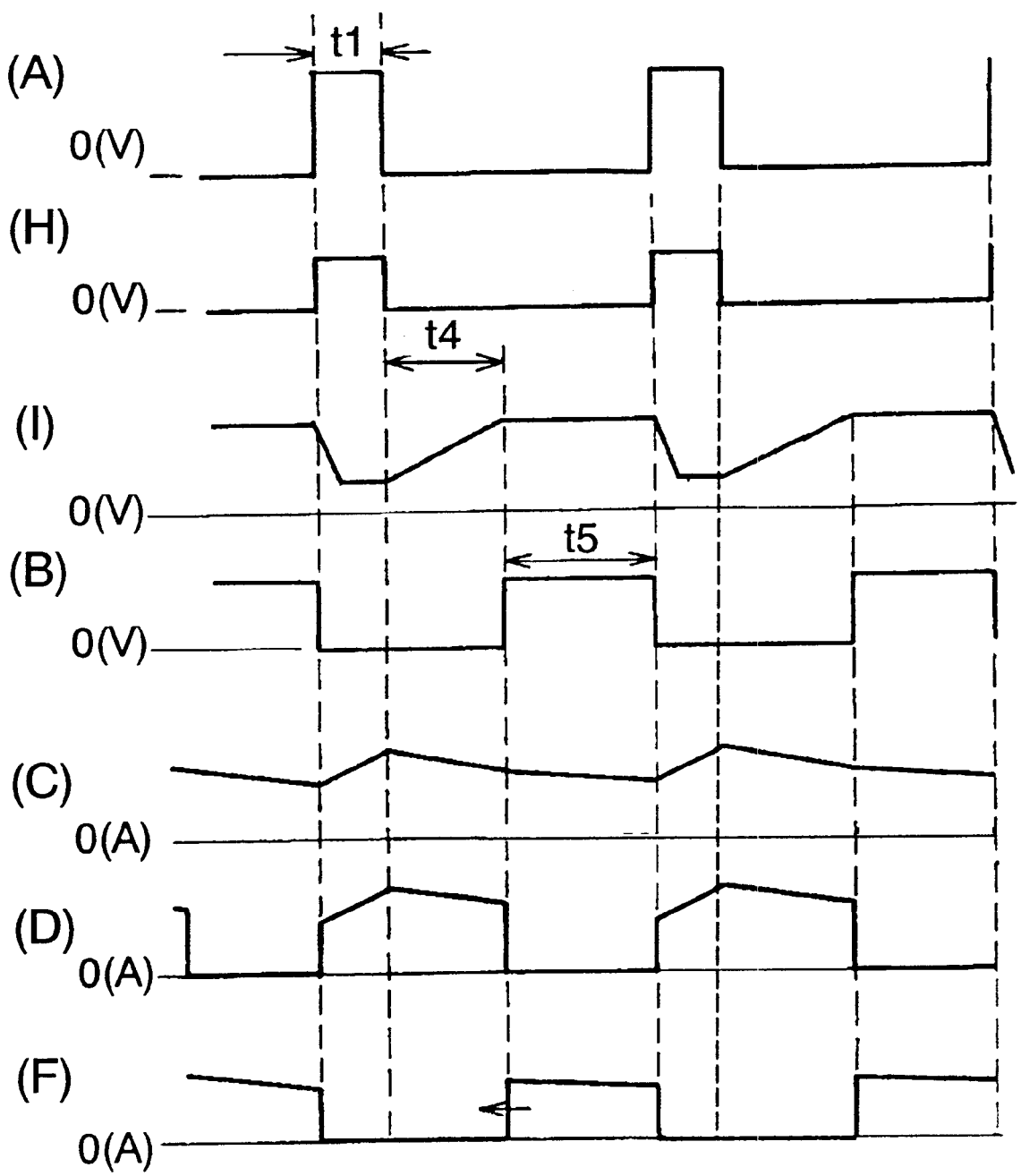
FIG. 3 is another graphical illustration representing operation of the same.

Operation as illustrated in FIG. 1 and FIG. 3 will be described concretely. Here, FIGS. 3(A), (C) and (D) are identical to FIGS. 2(A), (C) and (D) respectively.

The pulse generator circuit 27 outputs a reset pulse of high-level (refer to FIG. 3(H)) for a period of "t1", after shaping a voltage waveform from the cathode side of the rectifier element 5.

The charge/discharge circuit 28 discharges electric charge in the capacitor 29 during the high-level period of the reset pulse (refer to FIG. 3(I)).

On the other hand, the differential circuit 32 outputs a voltage differential (VR–VS) between a voltage (VS) of the smoothing circuit 22 and the reference voltage (VR) 33. The charge/discharge circuit 28 charges the capacitor 29 with electricity corresponding to the voltage differential. In other words, it charges the capacitor 29 for a period of "t4" as shown in FIG. 3(I) when the VS is lower than the VR. When the voltage of the capacitor 29 reaches a predetermined value or greater, an output of the waveform shaping circuit 30 reverses. As the result, the driving circuit 31 outputs a gate voltage shown in FIG. 3(B).

Here, the lower the VS is, the higher the output voltage of the differential circuit 32 becomes, and therefore the period of "t4" is shortened, as a charging current to the capacitor 29 increases. This increases the current to the smoothing circuit 22 because the high-level period of "t5" of the gate voltage is prolonged, and as the consequence the output voltage increases. The output voltage is thus maintained in this manner at the predetermined voltage (5 volts, for instance).

As described above, the output of constant voltage from the output terminal 24 can be realized by using the switching element 21 to supply to the smoothing circuit 22 a portion of the electric current that flows to the first rectifier element and the choke coil connected to the secondary winding of the transformer.

In addition, it is also possible to draw out stable outputs from the first output terminal and the second output terminal by dividing synchronously the electric current that flows through the first rectifier element and the choke coil connected to the secondary winding of the transformer, and directing alternately to the first smoothing circuit and the second smoothing circuit.

(Second Exemplary Embodiment)

Figure 4:
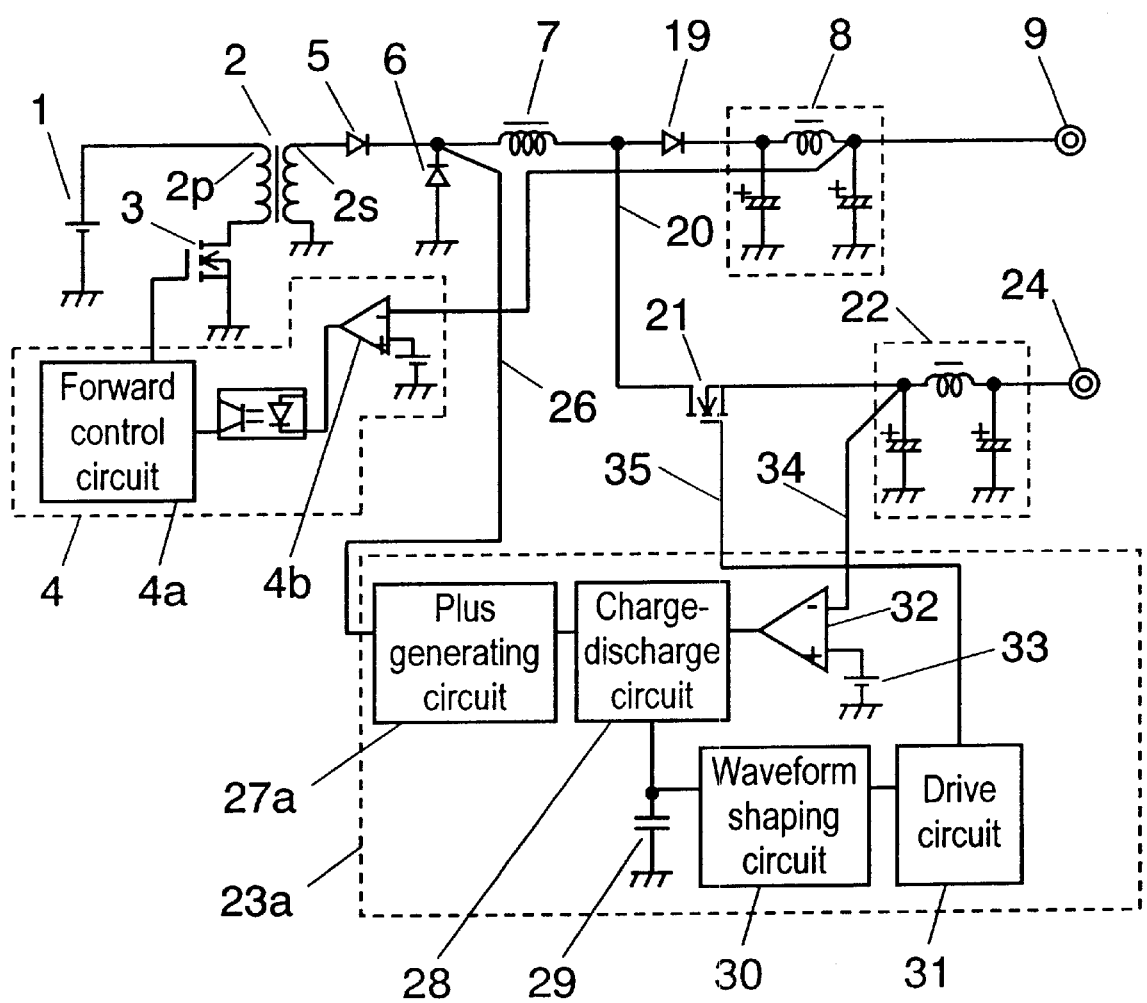
FIG. 4 is an electric circuit diagram of a power supply unit of a second exemplary embodiment of the invention.

FIG. 4 depicts an electric circuit diagram of a power supply unit of a second exemplary embodiment of the present invention. In FIG. 4, function of pulse generator circuit 27a that composes divider control circuit 23a is the only difference from the pulse generator circuit 27 shown in FIG. 1, and other structural components are analogous to those of FIG. 1.

Figure 5:
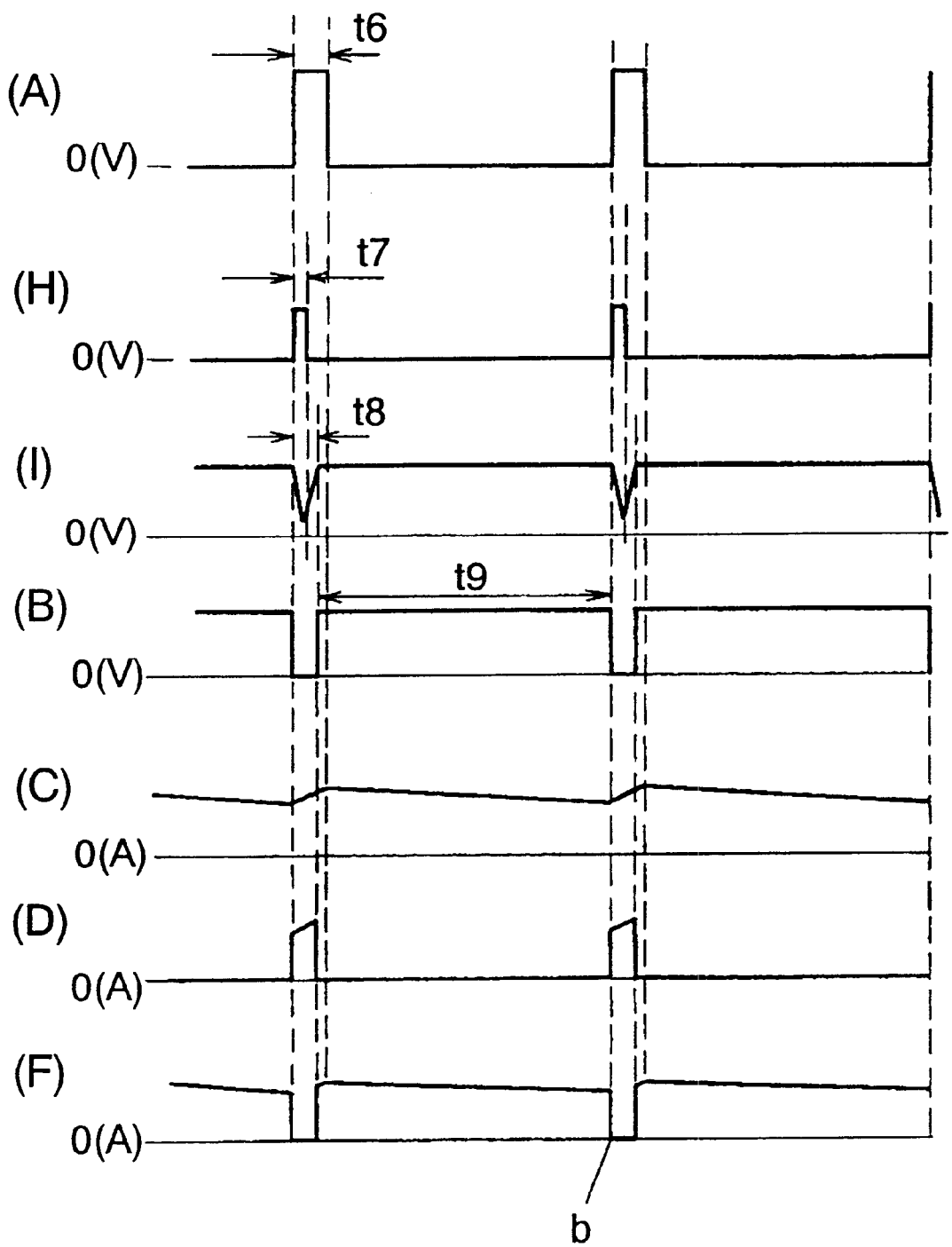
FIG. 5 is a graphical illustration representing operation of the same.

This exemplary embodiment is now described hereinafter with reference to FIG. 4 and FIG. 5.

The pulse generator circuit 27a differentiates a leading edge of pulse voltage (pulse width=t6) shown in FIG. 5(A) at a cathode side of rectifier element 5, and outputs a reset pulse of an infinitesimal pulse width (i.e. t7, where t7<t6) shows in FIG. 5(H). It is also possible to generate the reset pulse by combining the signal shown in FIG. 5(A) with a signal derived by integrating it. Use of this reset pulse for discharging the capacitor 29 makes it possible to shift from discharging phase to a charging phase in a short period of time (refer to FIG. 5(I)). In other words, it allows the capacitor 29 to start being charged while switching element 3 is still in the conducting period (t6).

The structure composed as described above enables the output (refer to FIG. 5(B)) of the driving circuit 31 to initiate passage of current to the MOSFET 21 during the period (t6) in which the switching element 3 is conductive. Here, FIG. 5, (C) represents an electric current to the choke coil 7, and (D) represents an electric current to the switching element 19.

According to the present exemplary embodiment as described, it is possible to make the MOSFET 21 continue passing the current for a longer period than that of the first exemplary embodiment by shortening the discharging period of the capacitor. Thus, it becomes possible to output a greater power from the output terminal 21 even when the output terminal 9 carries a small load.

(Third Exemplary Embodiment)

Figure 6:
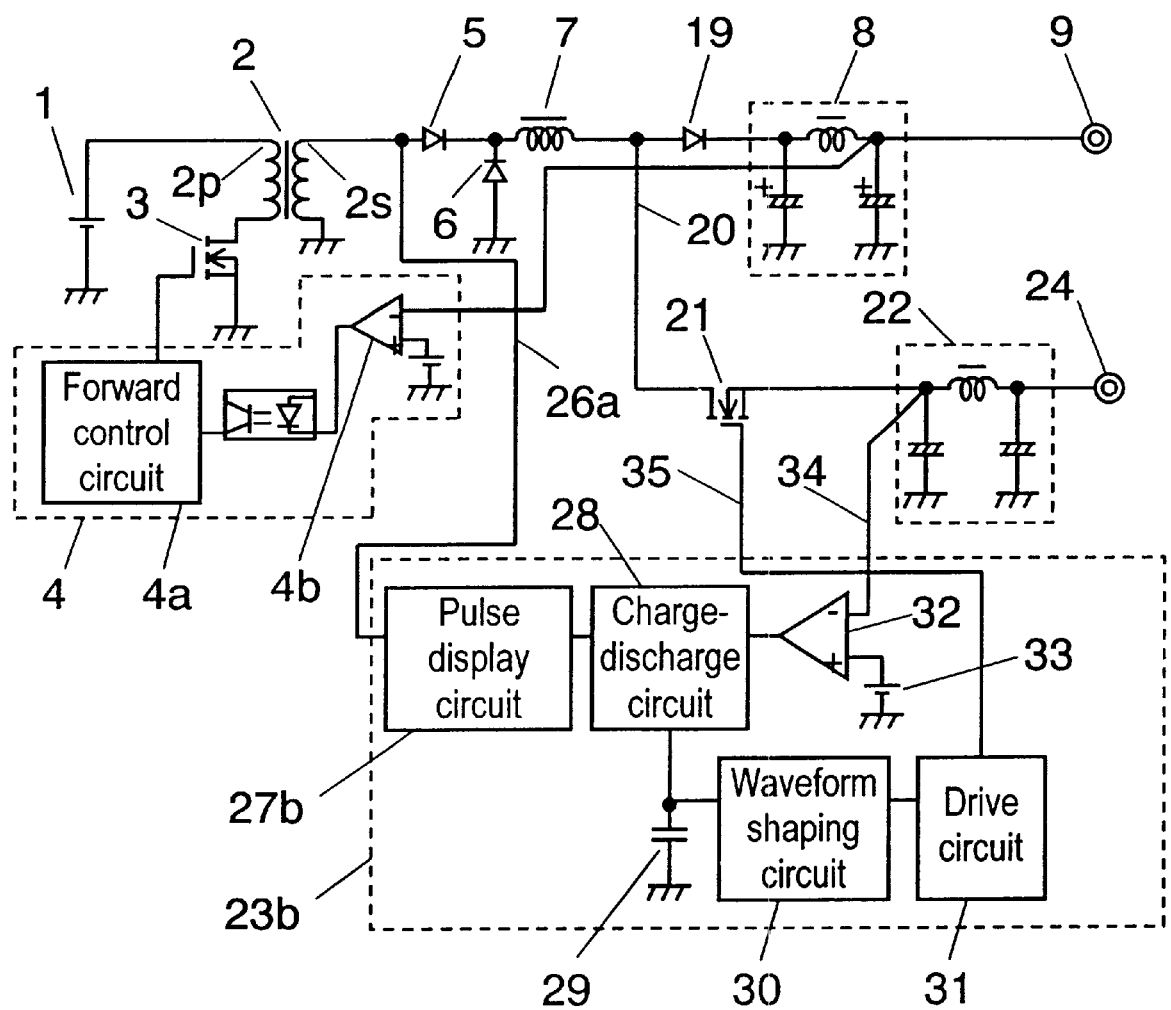
FIG. 6 is an electric circuit diagram of a power supply unit of a third exemplary embodiment of the invention.

FIG. 6 depicts an electric circuit diagram of a power supply unit of a third exemplary embodiment of the present invention. In FIG. 6, pulse delay circuit 27b that constitutes divider control circuit 23a is incorporated to replace the pulse generator circuit 27 shown in FIG. 1. Other structural components are analogous to those of FIG. 1.

Figure 7:
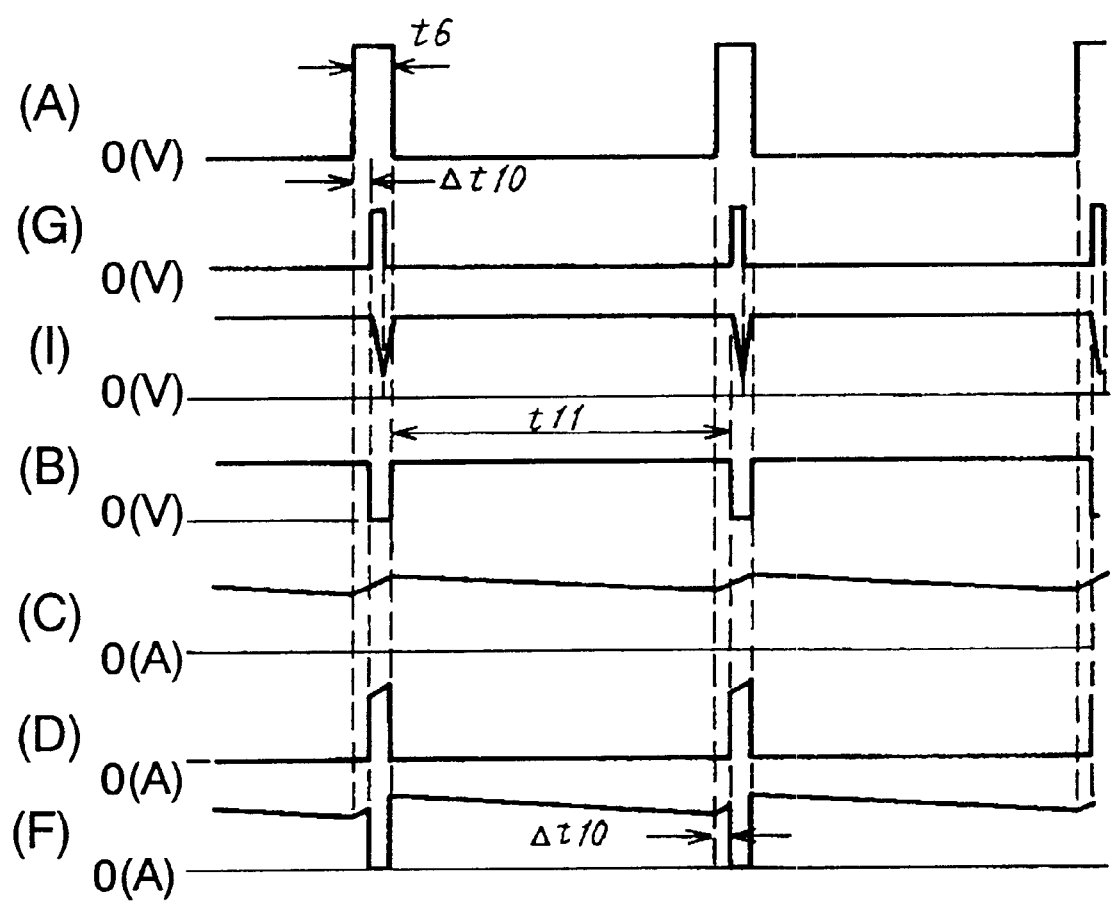
FIG. 7 is a graphical illustration representing operation of the same.

This exemplary embodiment will be described hereinafter with reference to FIG. 6 and FIG. 7.

The pulse delay circuit 27a detects a leading edge of pulse voltage (pulse width=t6) shown in FIG. 6(A) at a cathode side of rectifier element 5. It then outputs a reset pulse of an infinitesimal pulse width with a delay of Ä10 (refer to FIG. 7(G)).

Capacitor 29 is discharged using this reset pulse. That is, the capacitor 29 starts being discharged in the midst of the period (t6) wherein switching element 3 is still in the conductive state. It then becomes possible to shift into a charging phase immediately thereafter (refer to FIG. 7(I)).

As the result, MOSFET 21 can be held conductive until the following reset pulse is generated (refer to FIG. 7(F)). In other words, the MOSFET 21 becomes conductive for the period of Ä10 within a period in which a current to choke coil 7 (refer to FIG. 7(C)) flows through rectifier element 6 and an electric power is supplied to transformer 2 via the switching element 3. Because the electric current is supplied in this manner to output terminal 24, forward controller 4 operates as if there is equivalently a load to output terminal 9 even when the load to the output terminal 9 is small, i. e., the current flowing through switching element 19 (refer to FIG. 7(D)) is small, and thereby a large output current can be taken out of the output terminal 24.

Thus, the invention, as described, makes possible an output of large current from the output terminal 24 even when there is no load at the output terminal 9, by means of accurately controlling the switching element 3 using the delayed reset pulse of short time width to discharge the capacitor.

(Fourth Exemplary Embodiment)

Figure 8:
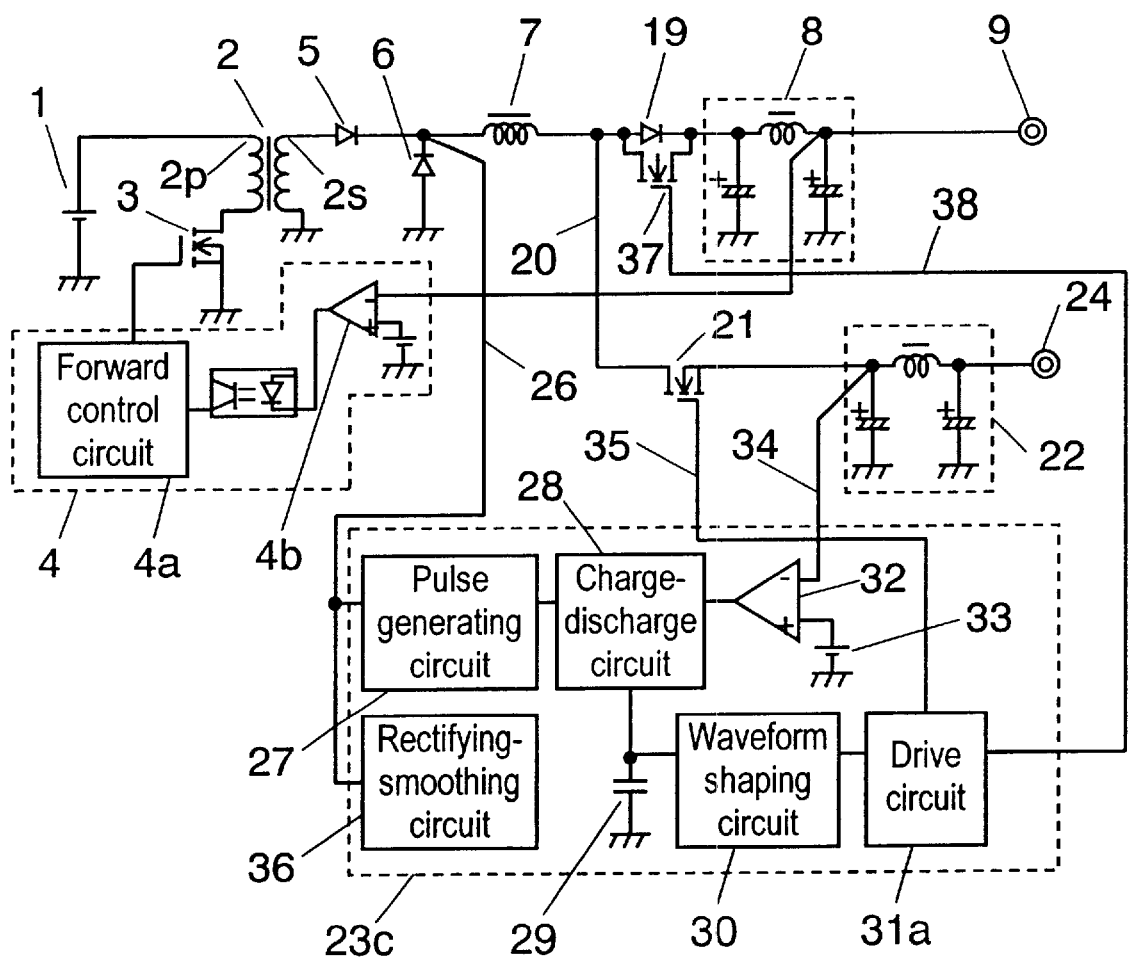
FIG. 8 is an electric circuit diagram of a power supply unit of a fourth exemplary embodiment of the invention.

FIG. 8 represents an electric circuit diagram of a power supply unit of a fourth exemplary embodiment of the present invention. Here, smoothing circuit 36 is provided in divider control circuit 23c as an internal power supply.

An output voltage normally generated in secondary winding 2s of transformer 2 is positive voltage and negative voltage with a peak value of more than 10 volts. The output voltage of the secondary winding 2s, after being rectified by rectifier element 5 (refer to FIG. 7(A)) is input to the rectifier smoothing circuit 36. The rectifier smoothing circuit 36 outputs a D.C. voltage of more than 10 volts. This output voltage is supplied to individual circuits in the divider control circuit 23c. A structure constructed as above makes it possible to control switching element 21 easily with low cost.

In FIG. 8, switching element 37 constructed of a MOSFET is connected in parallel with a diode constituting switching element 19. The switching element 37 is controlled by driving circuit 31a in the divider control circuit 23c.

The structure as described above can prevent heating of the diode constituting the switching element 19 even when a load connected to output terminal 9 is large, thereby making a heat sink unnecessary. Also, a signal of reverse polarity to that of the driving circuit 31a to drive switching element 21 can suffice to be a driving signal for the switching element 37, and therefore it can be generated easily.

Functions and operation of the other structural components are analogous to those of the first exemplary embodiment, and their details are thus skipped.

(Fifth Exemplary Embodiment)

Figure 9:
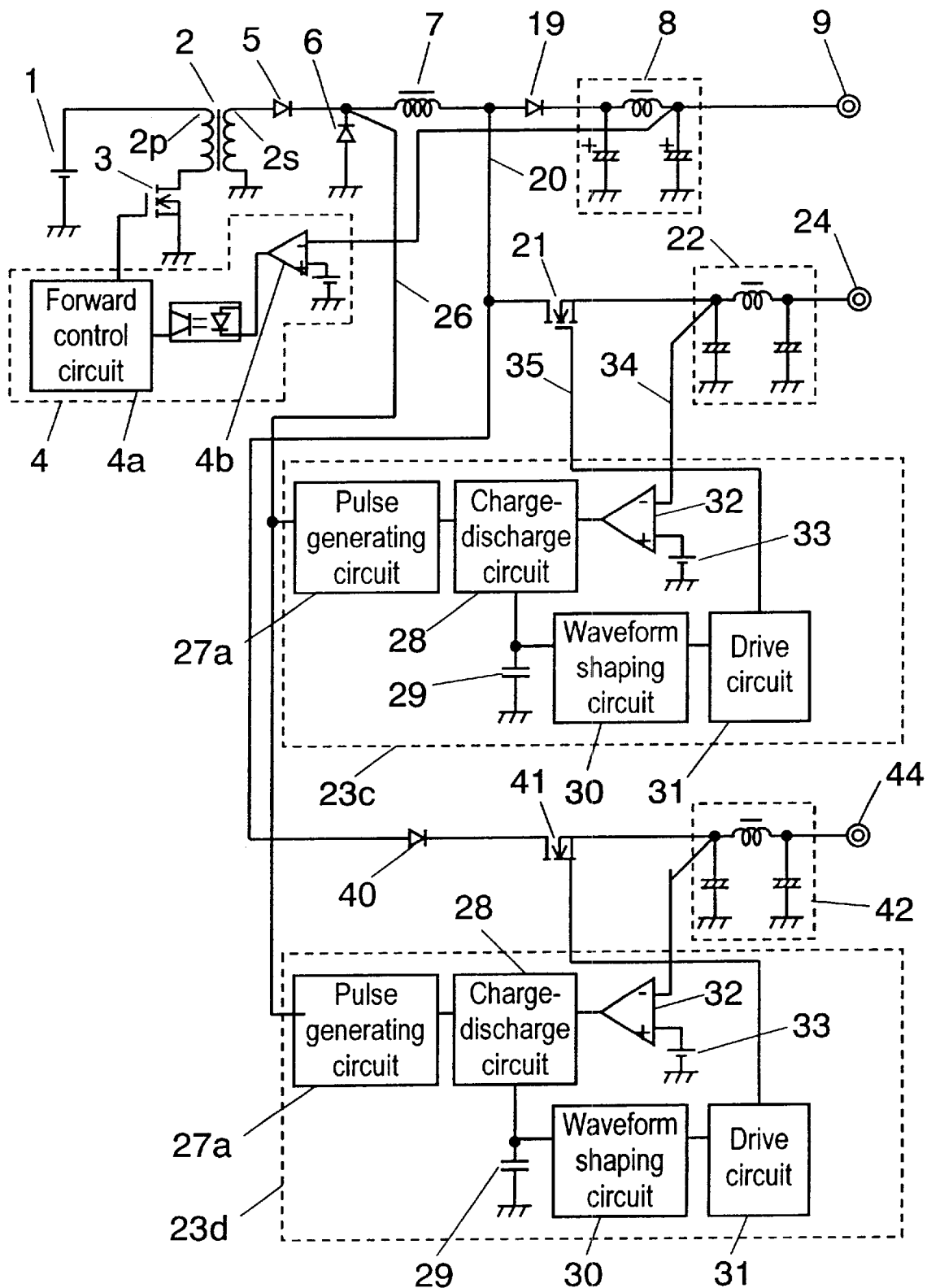
FIG. 9 is an electric circuit diagram of a power supply unit of a fifth exemplary embodiment of the invention.

FIG. 9 represents an electric circuit diagram of a power supply unit of a fifth exemplary embodiment of this invention, and it has divider control circuit 23d as well as switching element 40, another switching element 41, smoothing circuit 42 and output terminal 44 disposed in parallel to the structure shown in FIG. 1. As a result, it makes available a power supply of three different outputs.

Here, the switching element 40 connected between choke coil 7 and switching element 19 is to prevent a reverse current. It is necessary for output voltages to satisfy a condition that output terminal 9 has the highest in potential, the output terminal 44 the next, and output terminal 24 the lowest. However, a difference in potential among these individual outputs can even be 0.1 volt, for instance.

In FIG. 9, an electric current that flows to the choke coil 7 is divided sequentially in a time base from the one with the highest output voltage. That is, divider control circuit 23c and the divider control circuit 23d operate in such a manner that they turn the switching elements 40 and 41 into continuity after the electric current flows to the switching element 19, and finally the switching element 21 into continuity.

As is obvious from the foregoing, a multi-output supply device for producing a plurality of outputs can be realized when a number of combinations, each comprising divider control circuit 23*d*, switching element 40, switching element 41, smoothing circuit 42 and output terminal 44, are connected in parallel.

(Sixth Exemplary Embodiment)

Figure 10:
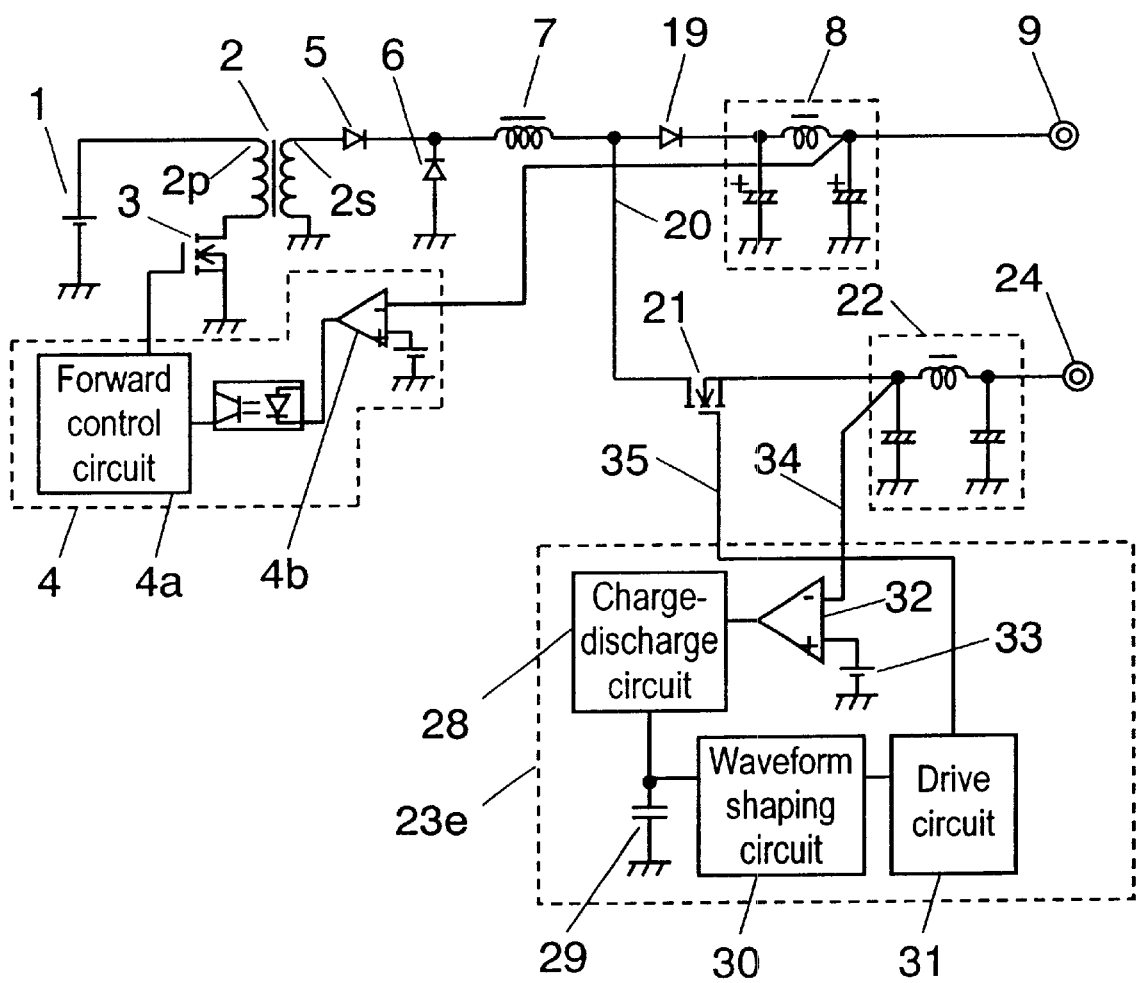
FIG. 10 is an electric circuit diagram of a power supply unit of a sixth exemplary embodiment of the invention.

FIG. 10 depicts an electric circuit diagram of a power supply unit of a sixth exemplary embodiment of this invention. The structure of FIG. 10 is analogous to the power supply unit shown in FIG. 1 except that the pulse generator circuit 27 is excluded from the divider control circuit 23.

Divider control unit 23*e* of this exemplary embodiment will be described hereinafter with reference to FIG. 10.

When a voltage of smoothing circuit 22, which is the voltage input to differential circuit 32, increases beyond reference voltage 33, an output of the differential circuit 32 decreases. As a result, charge/discharge circuit 28 discharges capacitor 29.

On the contrary, the output of the differential circuit 32 increases when the voltage of the smoothing circuit 22 decreases below the reference voltage 33. Consequently, the charge/discharge circuit 28 charges the capacitor 29 in the like manner as the first exemplary embodiment. A voltage of the capacitor 29 is fed through waveform shaping circuit 30 to driving circuit 31, so that its output drives MOSFET 21 to charge the smoothing circuit 22 and to control an output voltage, in the same manner as the foregoing first exemplary embodiment.

As described above, a pulse generator circuit is not necessary in the divider control circuit if a load to the output terminal 24 is not so large, thereby making the power supply unit even smaller and less costly.

(Seventh Exemplary Embodiment)

Figure 11:
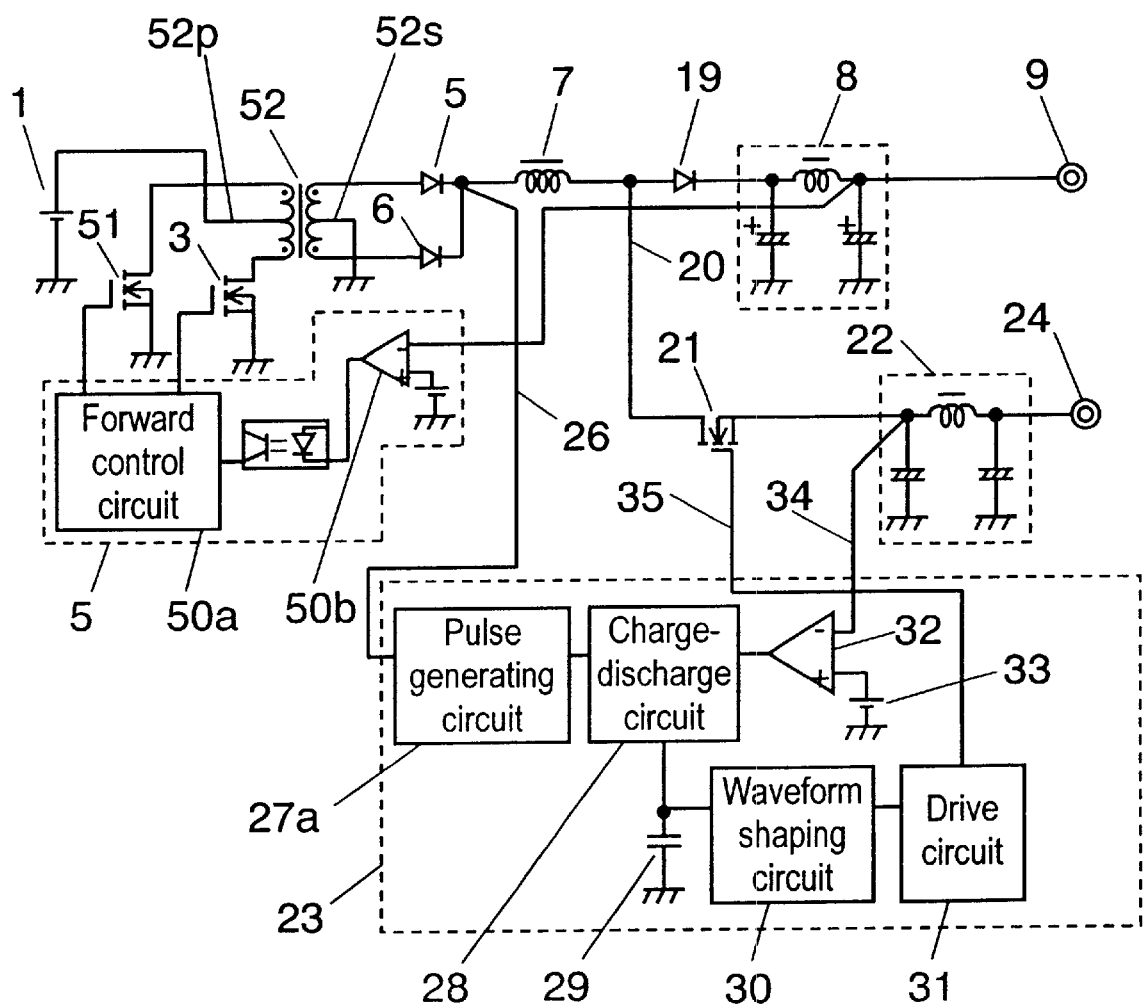
FIG. 11 is an electric circuit diagram of a power supply unit of a seventh exemplary embodiment of the invention.
Figure 12:
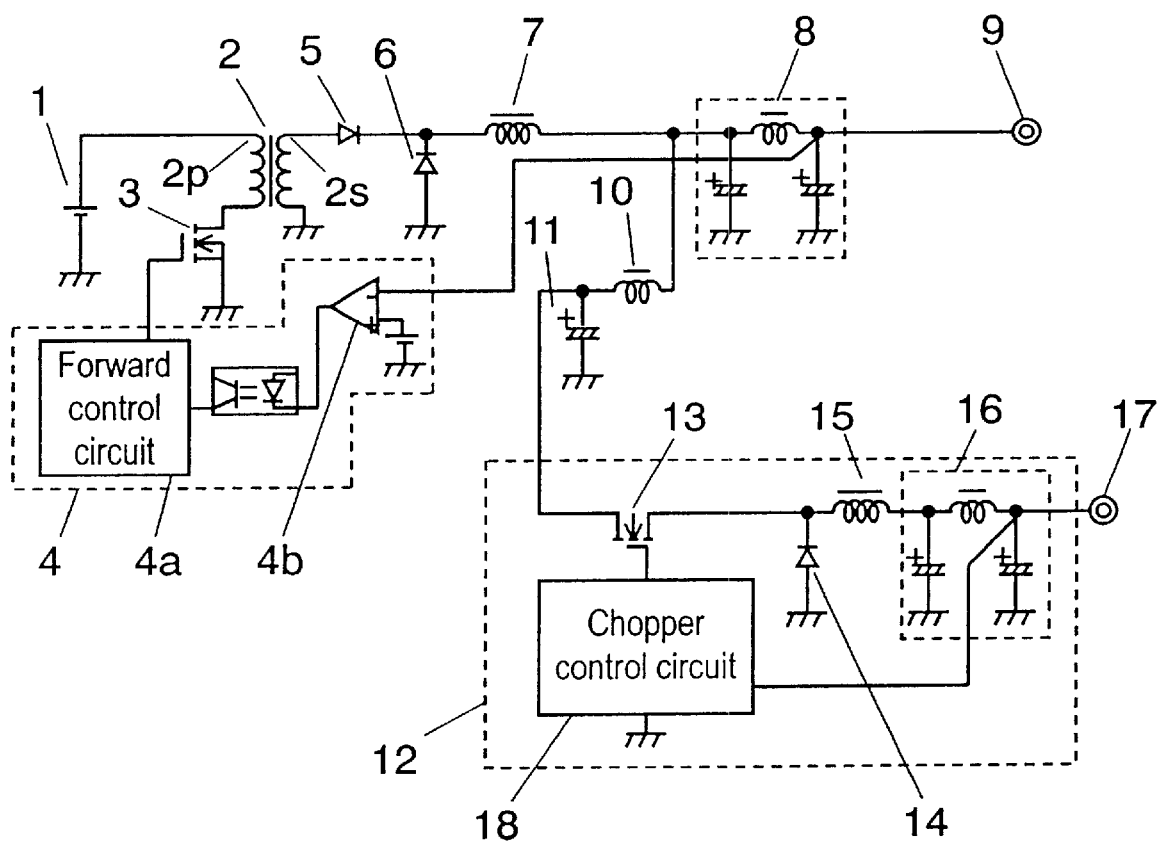
FIG. 12 is an electric circuit diagram of a power supply unit of the prior art.

FIG. 11 represents an electric circuit diagram of a power supply unit of a seventh exemplary embodiment of this invention. In FIG. 11, D.C. power supply 1 is connected to a center tap of primary winding 52*p* of transformer 52, and switching element 3 and another switching element 51 are connected to both ends of the primary winding 52*p* respectively. Forward control circuit 50 controls the switching elements 3 and 51 in a manner that they become conductive alternately. A center tap of secondary winding 52*s* of the transformer 52 is grounded, and anode terminals of rectifier elements 5 and 6 are connected to both ends of the secondary winding 52*s* respectively. Cathode terminals of the rectifier elements 5 and 6 are connected together, and to choke coil 7 and pulse generator circuit 27*a*. Other structural components are identical to those of the first exemplary embodiment.

Fundamental operation is generally analogous to what have been described in the first through the sixth exemplary embodiments. Since the switching elements 3 and 51 in the primary side of the transformer 52 for supplying electric power perform the switching operations alternately, they can make available an output of high electric power.

Accordingly, the present invention described above makes possible the advantage of eliminating a choke coil for converting voltage, and another choke coil and a capacitor for the smoothing circuit.

INDUSTRIAL APPLICABILITY

As described above, the present invention makes possible reductions in size and weight of the power supply unit and electronic apparatus using the same.

LIST OF REFERENCE NUMERALS

1. D.C. power supply
2, 52. Transformer
3, 13, 51. Switching element
4, 50. Forward controller
5, 6, 14. Rectifier element
7, 10, 15. Choke coil
8, 16, 22, 42. Smoothing circuit
9, 17, 24, 44. Output terminal
11. Capacitor
12. Chopper power supply unit
18. Chopper control circuit
19, 40. Switching element
20, 26, 34. Connecting line
21, 41. Switching element
23. Divider control circuit
27. Pulse generator circuit
28. Charge/discharge circuit
29. Capacitor
30. Waveform shaping circuit
31. Driving circuit
32. Differential circuit
33. Reference voltage

What is claimed is:

1. A power supply unit comprising:
   a transformer having a primary winding connected in series to a D.C. power supply;
   a first switching element connected in series to said primary winding;
   a first rectifier element connected in series to a secondary winding of said transformer;
   a choke coil connected in series to said first rectifier element;
   a second switching element connected in series to said choke coil;
   a first smoothing circuit connected in series to said second switching element;
   a second rectifier element connected in parallel with said first rectifier element and said secondary winding;
   a control circuit for controlling a conducting period of said first switching element responsive to an output voltage of said first smoothing circuit;
   a third switching element connected in series to said choke coil;
   a second smoothing circuit connected in series to said third switching element; and
   a divider control circuit having a first input terminal receiving any of an input voltage and an output voltage of said second smoothing circuit, for extracting an electric current only of a give period from a current passing through said choke coil, and for controlling a conducting period of said third switching element.

2. The power supply unit as set forth in claim 1, wherein said divider control circuit further has a second input terminal connected to one of terminals of said first rectifier element.

3. The power supply unit as set forth in claim 2, wherein said divider control circuit further comprises:
   a charge/discharge circuit for charging and discharging a capacitor having one terminal grounded;
   a pulse generator circuit for generating a reset pulse with an input signal received in said second input terminal; and
   a waveform shaping circuit for comparing an output voltage of said capacitor with a predetermined voltage, and outputting a gate signal to control the conducting period of said third switching element, wherein said charge/discharge circuit resets an electric charge of said capacitor by said reset pulse, and charges or discharges said capacitor according to the voltage received in said first input terminal.

4. The power supply unit as set forth in claim 3, wherein said pulse generator circuit generates a reset pulse of a time-width shorter than the conducting time of said first switching element.

5. The power supply unit as set forth in claim 4, wherein said pulse generator circuit includes a pulse delay circuit.

6. The power supply unit as set forth in claim 2, wherein said divider control circuit includes a smoothing circuit for power supply within said divider control circuit.

7. The power supply unit as set forth in claim 2, further comprising a fourth switching element connected in parallel with said second switching element, wherein said second switching element is comprised of a rectifier element, and said divider control circuit controls a conducting period of said fourth switching element.

8. The power supply unit as set forth in claim 2, further comprising:

a fifth switching element connected in series to said choke coil;

a third smoothing circuit connected in series to said fifth switching element; and a second divider control circuit, wherein said second divider control circuit controls a conducting period of said fifth switching element according to a voltage from said third smoothing circuit.

9. An electronic apparatus having a load device, a controller for said load device, and a power supply unit for said toad device and said controller, wherein said power supply unit comprises:

a transformer having a primary winding connected in series to a D.C. power supply;

a first switching element connected in series to said primary winding;

a first rectifier element connected in series to a secondary winding of said transformer;

a choke coil connected in series to said first rectifier element;

a second switching element connected in series to said choke oil;

a first smoothing circuit connected in series to said second switching element;

a second rectifier element connected in parallel with said first rectifier element and said secondary winding;

a control circuit for controlling a conducting period of said first switching element responsive to an output voltage of said first smoothing circuit;

a third switching element connected in series to said choke coil;

a second smoothing circuit connected in series to said third switching element; and a divider control circuit having a first input terminal receiving any of an input voltage and an output voltage of said second smoothing circuit, for extracting an electric current only of a give period from a current passing through said choke coil, and for controlling a conducting period of said third switching element, wherein the output voltage of said first smoothing circuit is set higher than the output voltage of said second smoothing circuit, the output voltage of said first smoothing circuit is supplied to said load device, and the output voltage of said second smoothing circuit is supplied to said controller.

10. The electronic apparatus as set forth in claim 9, wherein said divider control circuit further has a second input terminal connected to one of terminals of said first rectifier element.

* * * * *

UNITED STATES PATENT AND TRADEMARK OFFICE
CERTIFICATE OF CORRECTION

PATENT NO.     : 6,498,734 B1
DATED          : December 24, 2002
INVENTOR(S)    : Takuya Nishide It is certified that error appears in the above-identified patent and that said Letters Patent is hereby corrected as shown below:

Column 8,
Line 51, change "only of a give period" to -- only of a given period --;

Column 10,
Line 8, change "choke oil" to -- choke coil --;
Line 24, change "only of a give period" to -- only of a given period --.

Signed and Sealed this

Twenty-second Day of July, 2003

JAMES E. ROGAN
*Director of the United States Patent and Trademark Office*